United States Patent [19]
Kronberg et al.

[11] Patent Number: 5,860,711
[45] Date of Patent: Jan. 19, 1999

[54] ISOLATION ENCLOSURE

[76] Inventors: James W. Kronberg, 108 Independent Blvd., Aiken, S.C. 29803; Kenneth W. Haerer, 2330 Stag Run Blvd., Clearwater, Fla. 34625

[21] Appl. No.: 636,194

[22] Filed: Apr. 22, 1996

[51] Int. Cl.$^6$ .................................................... A61G 11/00
[52] U.S. Cl. .......................... 312/1; 160/84.01; 160/102
[58] Field of Search ................................... 312/1, 4, 297; 600/21, 22; 435/809; 160/84.01, 102

[56] References Cited

U.S. PATENT DOCUMENTS

| | | |
|---|---|---|
| 3,498,687 | 3/1970 | Diccianni . |
| 3,670,718 | 6/1972 | Brendgord . |
| 3,926,242 | 12/1975 | Lowe . |
| 4,104,836 | 8/1978 | Weibull . |
| 4,920,768 | 5/1990 | Cares et al. ................................. 312/1 |
| 5,205,624 | 4/1993 | Martell et al. . |
| 5,316,733 | 5/1994 | Rune et al. . |

*Primary Examiner*—Michael Safavi
*Attorney, Agent, or Firm*—Maria Reichmanis

[57] ABSTRACT

An enclosure for isolating material from the ambient atmosphere yet allowing free access to the interior. The front wall of the enclosure includes a window portion and at least one opening with a frame assembly mounted therein. The frame assembly includes a first movable access frame and a first flexible curtain; at least one second movable access frame and a second flexible curtain are mounted in the first frame. The first frame is movable from side to side across the opening; the second frame is movable from side to side across the first frame, perpendicular to the direction of movement of the first frame. As the first and second frames are moved, the first and second curtains move also, such that the only opening through the front wall is through an access port in the second frame. By moving the first and second frames, the user has ready access to substantially all the interior of the enclosure, and can position the access port wherever convenient for the task at hand. In a preferred embodiment, the front wall has at least two openings, each with a frame assembly mounted therein, one for each hand so that the respective access ports can be positioned independently of one another. Access to the interior of the enclosure is limited to the port(s) so that air flow requirements are significantly reduced without limiting accessibility. Reduced air flow results in reduced utility costs and reduced worker exposure to noxious fumes, toxic materials, etc.

33 Claims, 5 Drawing Sheets

ISOLATION ENCLOSURE

BACKGROUND OF THE INVENTION

1. Field of the Invention

The present invention relates to isolation enclosures. In particular, the present invention relates to an isolation enclosure with ports that can be positioned in two dimensions, both horizontally and vertically.

2. Discussion of Background

Many industrial, medical and laboratory operations require relatively contamination-free, controlled environments. For example, solid state electronic components are frequently manufactured in "clean rooms" or "clean enclosures" where the concentration of particulates is kept to a minimum in order to ensure the quality of the products. Activities that require handling of hazardous materials are carried out in clean enclosures to protect the worker from the presence of harmful fumes or other contaminants; medical tests are frequently performed in clean enclosures to prevent contamination of samples.

For applications where it is necessary to protect workers from the contents of the enclosure, the interior of the enclosure is maintained at a pressure slightly below atmospheric pressure. Typically, fans exhaust the air passing through the enclosure to the atmosphere; in-line filters prevent toxic materials from entering the atmosphere. In the manufacture of pharmaceuticals and electronic components, it is necessary to protect the product from airborne contamination. For these applications, the interior pressure is somewhat greater than atmospheric pressure so that air tends to flow out of the enclosure.

Many different types of enclosures are available, known by as many names (including the terms "clean box," "hood," "clean work station," "containment," "glove box," "incubator," "material isolation enclosure," "clean enclosure," and "enclosure"). The most common type of enclosure is the familiar laboratory hood with an open front and an exhaust fan connected to the rear or top of the hood. The fan draws air into the hood from the open front, thus tending to sweep material away from the user. Enclosures with closed fronts generally include one or two access ports, sometimes having air-impermeable gloves sealed to the margin of the port to prevent external air from entering the enclosure. The user works on materials inside the box by placing his or her hands and arms in the gloves.

Many enclosures, including typical laboratory fume hoods, present two basic problems to the user. First, when the user stands or passes in front of the hood, an eddy current is formed by air being drawn past his body. This eddy current may draw toxic fumes towards him or out of the hood into the environment. While much research remains to be done on the causes and prevention of workplace-related illness and the effects of exposure to low levels of toxic compounds, it is clear that the incidence of employee illnesses and absenteeism are directly related to the quality of the work environment. An unhealthy work environment, with poor air quality due to the presence of contaminants, is associated with high rates of work-related illness and absenteeism.

Second, standard fume hoods draw a significant amount of air from the surrounding area (whether a manufacturing facility or a laboratory) and exhaust it. This warmed or cooled air must continually be replaced for the comfort and well-being of those who work in the area, forcing climate control systems to be operated at a higher capacity or for a higher percentage of the time, thereby resulting in higher utility costs. In some cases, existing climate control systems may fail to maintain adequate comfort levels for workers because of this waste of conditioned air.

In U.S. Pat. No. 5,205,624, Martell et al. describe an enclosure similar to a glovebox for isolating materials from the atmosphere, yet allowing the user to manipulate materials and apparatus located inside the enclosure. As represented schematically in FIG. 1, an enclosure 20 of this type is a box with structural framing members 22, 24, 26 surrounding a plurality of transparent plastic front panels 28 (three panels 28 are shown). In a conventional glovebox, the area below panels 28 (the "access zone") is open, so that the user may insert his or her hands into the box to manipulate materials and apparatus located therein.

Figure 1:
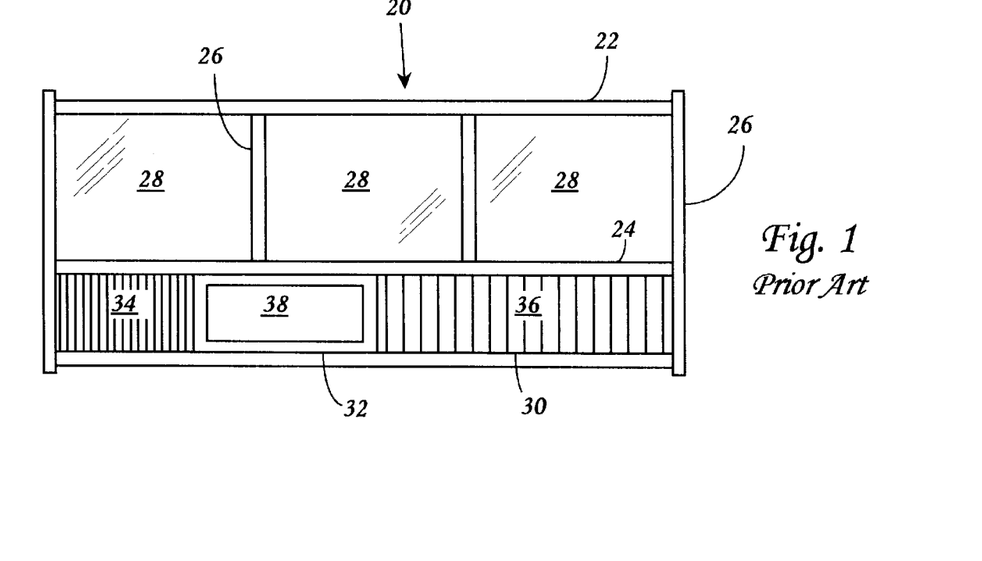
FIG. 1 is a front view of a prior art material isolation enclosure.

In enclosure 20, however, the area below panels 28 defines an access zone 30 which contains an access frame 32 and two flexible, bellows-like curtains 34, 36. The user may insert his hands into the interior of enclosure 20 through an access space 38 defined by frame 32.

Frame 32 is movable to allow the user to access different portions of the interior of enclosure 30. As frame 32 is moved from side to side across access zone 30, curtains 34, 36 also move in such a way that the only opening into enclosure 20 is through the frame. In a preferred embodiment wherein a negative pressure is maintained inside enclosure 20, access frame 32 is made of members having an airfoil shape to reduce turbulence and enhance materials retention within the enclosure. Enclosure 20 gives the user access to most of its interior via frame 32, while reducing the needed airflow since the remaining portions of access zone 30 are curtained off.

Rune, et al. (U.S. Pat. No. 5,316,733) describe an isolation enclosure with two rubber gloves into which the user inserts his hands and forearms. The front of the enclosure includes two rigid plastic sheets: a first sheet with two oval openings and a second sheet, in front of the first sheet, with two circular openings to which the gloves are attached. The user pushes against the edges of the glove openings to slide the second sheet in the desired horizontal direction. Brendgord (U.S. Pat. No. 3,670,718) discloses a patient care wall having a window with a built-in upper-body suit that permits the user to perform work inside a sealed enclosure. Diccianni's ultra clean work station has two slidable access ports in an rectangular opening (U.S. Pat. No. 3,498,687). The ports are independently mounted, and each port has an iris-type closure. The remaining space in the opening is filled by collapsible panels.

Larger areas such as loading bays and warehouses may be isolated from the outside environment by means of door systems. By way of example, Weibull shows a loading bay door system having one or more movable frames with horizontally-foldable wall portions on either side (U.S. Pat. No. 4,104,836). Each frame supports a door consisting of accordion-fold panels. Lowe's system includes two doors, one of which opens upwardly across the full width of the doorway opening (U.S. Pat. No. 3,926,242). The other door consists of two outwardly-opening portions, one on each side of the doorway opening. These two doors can be adjusted to define a rectangular aperture of any desired height and width.

Many operations performed in an isolation enclosure require the user's hands to work at widely separated locations. For example, setting up or taking down equipment, or performing certain operations such as pipetting and column chromatography, may require one hand to be placed near the top of a piece of equipment and the other hand near the bottom. No known enclosure allows the user to have each hand at a different location inside the enclosure easily; typically, both hands must pass through one, relatively small opening. The size of this opening is subject to a severe tradeoff between arm mobility and airflow reduction, since the entire area not occupied by the user's arms is open to the outside. In particular, the vertical range of hand motion may be so restricted that work is essentially limited to two dimensions. Furthermore, for any given installation, only those persons whose elbows are approximately at the vertical level of the opening when standing or sitting are able to work comfortably; others, either taller or shorter, will quickly become fatigued.

There remains a need for a convenient, functional and ergonomically sound isolation enclosure. Such an enclosure would allow the operator easy access to substantially all the interior and to maintain an efficient, comfortable work position, while minimizing the transfer of air between the interior and the ambient atmosphere.

SUMMARY OF THE INVENTION

According to its major aspects and broadly stated, the present invention is an isolation enclosure that allows the user free access to substantially all of the interior of the enclosure. The front wall of the enclosure includes a window portion and at least one rectangular opening with a frame assembly mounted therein. The frame assembly includes a first movable access frame mounted in the opening; those portions of the opening not occupied by the first frame are covered by a first curtain assembly. A second movable access frame with an access port is mounted in the first frame; a second curtain assembly covers those portions of the first frame not occupied by the second frame. Both frames are movable approximately in the plane of the front wall: the first frame from side to side across the opening, and the second frame across the first frame, perpendicular to the direction of movement of the first frame. As the first and second frames are moved, the first and second curtain assemblies move also, in such a manner that the only opening through the front wall is through the access port in the second frame. By moving the first and second frames, the user has ready access to substantially all the interior of the enclosure, and can position the access port wherever convenient for the task at hand. In a preferred embodiment of the invention, the front wall has at least two openings, each with a frame assembly mounted therein, one frame assembly for each hand so that the respective access ports can be positioned independently of one another.

Because access to the interior of the enclosure is limited to the port or ports, air flow is significantly reduced, but without limiting accessibility. Reduced air flow results in reduced exposure to noxious fumes, toxic materials in the enclosure, and so forth, leading to overall improvements in air quality. Known beneficial effects of improved workplace air quality include improved employee morale, greater efficiency, reduced illness and absenteeism, and potentially the avoidance of litigation. Furthermore, utility costs are reduced because reduced air flow requirements for the enclosure largely eliminate the waste of conditioned air which is unavoidable with many other types of enclosures.

The frame assembly constitutes a major feature of the present invention. The frame assembly allows the user to position the access port in two dimensions—both horizontally and vertically—via two access frames. The first frame is movable across the opening approximately in the plane of the front wall; the second frame is mounted inside the first frame for movement perpendicular to the direction of movement of the first frame. Each frame is easily movable, yet offers sufficient resistance to movement so that it remains in place until the user wishes to move it to another location. This allows an individual user to position the access port in the most convenient location for a particular task, and easily move the port to another position whenever needed. Furthermore, the user can place the access port in an ergonomically sound position that reduces fatigue, fatigue-related errors, and long-term health risks such as repetitive stress injuries. The optimum access port position for each individual depends on such factors as his or her height, work position (sitting or standing), and the need to access different positions inside the enclosure for different tasks.

The ability to independently position two access ports—one port for each hand—is an important feature of the present invention which gives the user a greater effective range of motion for working within the enclosure than is otherwise possible. Many tasks are best performed with the hands at somewhat different locations (for example, at the top and bottom of a piece of equipment). If movement of the hands and forearms is constrained, apparatus may be manipulated less effectively and less safely, and the onset of fatigue may be more rapid. By moving each access port to the optimum position, workplace safety is enhanced, and work is performed more effectively and comfortably.

Another feature of the present invention is its versatility. A variety of configurations are possible for the frame assembly or assemblies, depending on the anticipated use of the enclosure: one or two frame assemblies may be provided, with access ports designed for one hand or two hands, positioned wherever desired in the front wall of the enclosure, aligned vertically or horizontally. An enclosure according to the present invention may be equipped with a single work station or a plurality of work stations, each work station having its own set of frame assemblies. Similarly, an enclosure may have two or more walls fitted with a frame assembly or assemblies, thereby allowing the user (or users) to approach the interior from different angles. If desired, the entire front wall of the enclosure may quickly and easily be replaced by another front wall having a different configuration, thereby rendering a single enclosure adaptable to a wide range of uses.

Still another feature of the present invention is the curtain assemblies, which together cover substantially all portions of the opening save for those occupied by the access frames and the access port(s). The curtain assemblies include curtains made of a flexible, transparent or semi-transparent material which expands and contracts in the manner of a bellows to ensure that the opening is substantially covered at all times, including times when the frames are being moved. Cellular drape material is suitable for use with the invention; pleated material, with the pleats perpendicular to the direction of expansion/contraction of the curtains, is also suitable.

Yet another feature of the present invention is the second access frame, which, through the access port, allows the user to manipulate materials and apparatus located inside the enclosure. The access port may be adapted to particular applications and individuals in a number of ways. For example, the second access frame may be dimensioned so that the user can comfortably insert both hands therethrough. For embodiments having two openings, each with its own second frame and access port, rounded ports that approximate the cross-sectional profile of a human forearm are preferred. If desired, the access port may be fitted with a glove, bellows, or one or more removable inserts to adjust the size of the opening to accommodate a particular user.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 19b is a side view of the door panel of FIG. 19a.

DETAILED DESCRIPTION OF A PREFERRED EMBODIMENT

In the following description, like reference numerals are intended to identify the same structural elements, portions of elements, surfaces, and areas consistently throughout the several drawing figures, as such elements, portions or surfaces may be further described or explained by the entire written specification. As used in the following description, the terms "horizontal," "vertical," "left," right," "up," "down," as well as adjectival and adverbial derivatives thereof, refer to the relative orientation of the illustrated structure as the particular drawing figure faces the reader. Similarly, the terms "inwardly" and "outwardly" refer to the orientation of a surface of revolution relative to its axis. The drawings are schematic representations of apparatus according to the present invention, thus, they include only components useful and necessary for understanding the invention.

Figure 2:
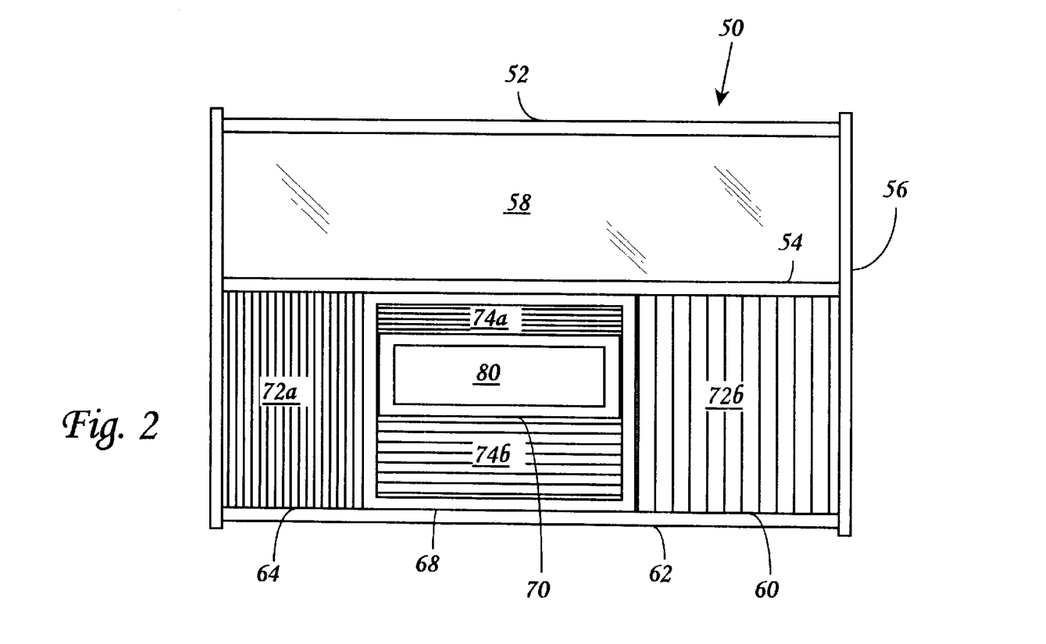
FIG. 2 is a front view of an enclosure according to a preferred embodiment of the present invention.

An isolation enclosure according to a preferred embodiment of the present invention has at least one access frame which can be positioned in two dimensions—both vertically and horizontally—by placing an inner access frame inside an outer, perpendicularly slidable access frame. Referring now to FIG. 2, there is shown a front view of such an isolation enclosure. An enclosure 50, like above-described enclosure 20, has structural framing members (52, 54, 56) surrounding a transparent front panel 58 (one panel 58 is shown; however, two or more panels may be used if preferred). The area below panel 58 defines an access zone 60 bounded by framing members 54, 56 and lower framing member 62.

Access zone 60 contains an access frame assembly 64 having two slidable access frames 68, 70, one inside the other, and two pairs of flexible curtains 72a, 72b and 74a, 74b. The user may insert one or both hands into enclosure 50 through an access space or port 80 defined by inner frame 70.

Frames 68, 70 are movable within access zone 60 to allow the user to access different portions of the interior of enclosure 50. The user may move frames 68, 70 upwards, downwards, or to either side simply by moving his forearms in the desired direction. As his wrists or arms bear against a side of inner frame 70, the frame slides in the desired direction. As first, outer frame 68 slides horizontally across the front of enclosure 50, curtains 72a, 72b expand and contract accordingly to seal the space on either side of frame 68. Second, inner frame 70 is movable in a direction perpendicular to the direction of movement of outer frame 68, i.e., vertically. As inner frame 70 slides vertically within outer frame 68, curtains 74a, 74b function in the same way as curtains 72a, 72b to seal the space above and below frame 68. Thus, access space 80 is the only opening into enclosure 50. Frames 68 and 70 are easily and comfortably movable, yet offer sufficient resistance to movement that, once positioned as desired, the frames remain in place until moved by the user.

Figure 3:
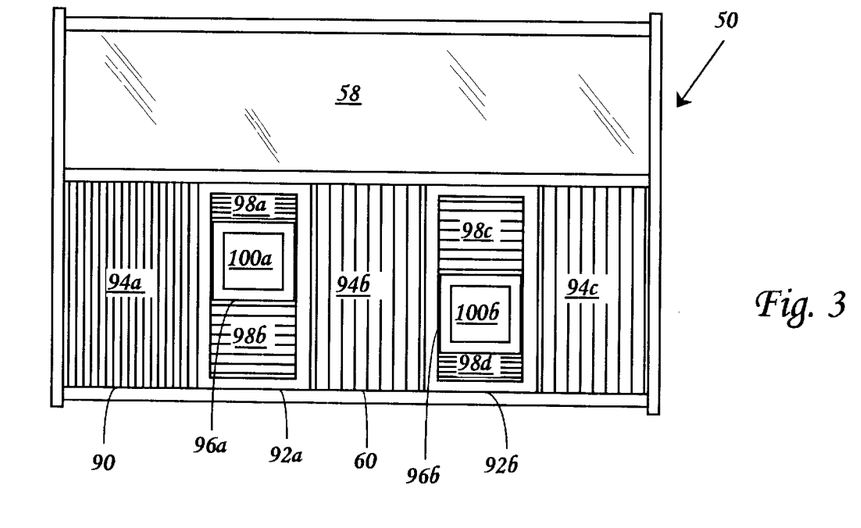
FIG. 3 is a front view of an isolation enclosure according to another preferred embodiment of the invention.

Another preferred embodiment of the present invention, illustrated in FIG. 3, offers the user more flexibility in accessing the interior of enclosure 50 and concomitantly greater freedom of movement for working inside the enclosure. Here, access zone 60 is fitted with an access frame assembly 90 having two outer, horizontally-slidable access frames 92a, 92b and three flexible curtains 94a, 94b, 94c. Outer frames 92a, 92b contain inner slidable frames 96a, 96b, respectively, each with its own pair of flexible curtains (98a, 98b, 98c, 98d). Inner frames 96a, 96b define a pair of access spaces or ports 100a, 100b, respectively. Use of frame assembly 90 minimizes the total area of opening(s) into enclosure 50, since ports 100a, 100b need only be large enough to permit the comfortable insertion of the user's hand and forearm into the enclosure. The user's comfort and convenience—and the functionality of enclosure 50—are enhanced, since the user's hands and arms can move almost completely independently of each other. Access ports 100a, 100b can be positioned wherever convenient for the task at hand, at different horizontal positions and also at differing heights.

Access frames 96a, 96b are illustrated as having approximately square access ports 100a, 100b. However, ports 100a, 100b are preferably ergonomically shaped to approximately the cross-sectional shape of a human arm, in order to still further reduce the unused space of ports 100a, 100b and resulting airflow through the ports. Thus, ports 100a, 100b are preferably rounded (wherein the term "rounded" refers to openings that are round, oval, elliptical, or otherwise rounded in shape). Similarly, access frame 70 may have a rounded opening (port 80) rather than the rectangular opening shown in FIG. 2.

Figure 4:
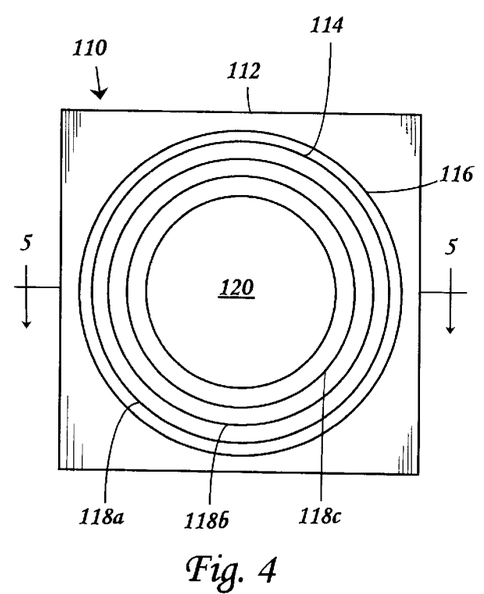
FIG. 4 is a detail view of an access frame usable with the isolation enclosure of FIGS. 2 and 3.
Figure 5:
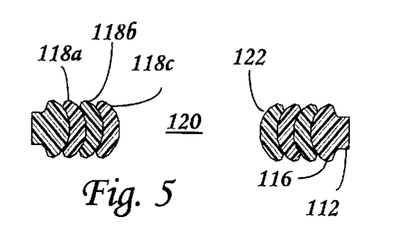
FIG. 5 is a cross-sectional view of the access frame of FIG. 4, taken along the lines 5—5 of FIG. 4.

In a preferred embodiment of the invention, each of inner frames 96a, 96b (as well as above-described inner frame 70) may consist of a slidable panel 110 that engages its respective outer frame (FIGS. 4, 5). Panel 110 includes an approximately square panel 112, preferably made of some rigid but light-weight material, with an ergonomically shaped opening 114. Opening 114 is preferably surrounded by a thickened and rounded rim 116, and contains at least one concentric, removable (and preferably replaceable), ring-shaped or sleeve-shaped insert, preferably a plurality of inserts such as 118a, 118b, 118c. The diameter of a central opening 120 thus formed may be varied by adding (or removing) inserts 118a, 118b, 118c in succession. Inserts 118a, 118b, 118c are preferably made of a flexible material that readily conforms to the shape of an object pressed against it, such as a hand, wrist or forearm. Suitable materials include high-density visco-elastic foam.

By way of example, for a panel 110 approximately 8' (20.3 cm) square, opening 114 is approximately 7' (17.8 cm) in diameter. By adding or removing inserts 118a, 118b, 118c, each insert being approximately ½' (13 mm) thick, the diameter of opening 120 may be varied in approximately ½' steps from its maximum (with no inserts in place) down to approximately 4' (10 cm). This range of diameters is capable of accommodating most normal adult human hands and forearms. The optimum dimensions of panel 110 (including the diameter of opening 114), together with the number and dimensions of inserts 118, are best determined by a modest amount of experimentation and observation for each particular application.

The inner surfaces 122 of rim 116 and of inserts 118 are preferably smoothly curved, for example, like the inner surface of a torus; as noted above, inserts 118 are preferably made of a somewhat flexible material. This configuration contributes to user comfort and minimizes the turbulence of air passing through opening 120 when enclosure 50 is not in use. In addition, rounded surfaces create a "venturi" effect with fast-moving air flow which, on removal of the user's hand and arm, tends to clean them of any contaminants which may have been picked up inside enclosure 50.

Figure 6:
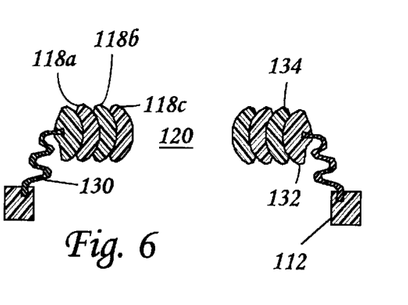
FIG. 6 and 7 each show cross-sectional views of another access frame usable with the invention.

Panel 112 may be fitted with an elastic bellows 130 analogous to the rubber "boot" that surrounds some automobile hand brakes or gearshift handles (FIG. 6). Bellows 130 supports a rigid or semi-rigid innermost frame 132 having an inner surface preferably smoothly curved like above-described surfaces 122. Frame 132 may contain one or more inserts 118a, 118b, 118c, and so forth. An arm inserted through opening 120 could readily be turned at various angles relative to the plane of panel 112 without binding against the panel.

Figure 7:
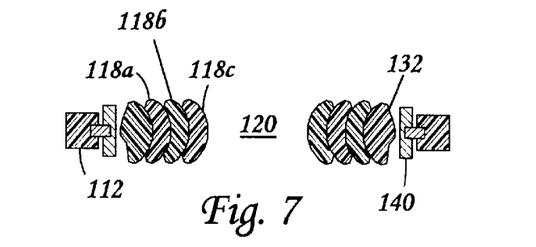

If desired, innermost frame 132 may be fixed approximately in the plane of panel 112, but pivotable by means of an arrangement of gimbals (represented schematically as 140, FIG. 7). As for the embodiment shown in FIG. 6, the inner surface of frame 132 is preferably smoothly curved; optional inserts 118a, 118b, and so forth allow the user to quickly and easily adjust the size of central opening 120.

Figure 8:
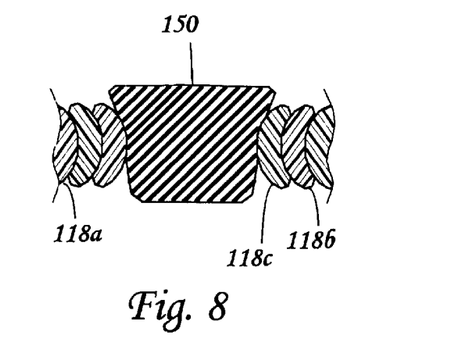
FIGS. 8 and 9 each show a cross-sectional view of a stopper usable with the access frame of FIGS. 4–7.
Figure 9:
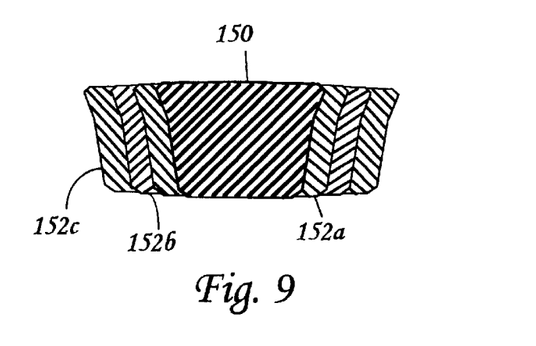

A plug or stopper 150 may be inserted into opening 120 to isolate the interior of enclosure 50 from the atmosphere when the enclosure is not in use, and also to foster energy conservation by making it possible to turn off the enclosure exhaust system (or place it on a lower setting) at such times (FIG. 8). Plug 150 is preferably made of a lightweight, durable, resilient, and slightly compressible material which is easily cleaned or decontaminated. Plug 150 may be made of the same material as is used to make inserts 118 if desired. For example, the plug and inserts might be molded from an open-cell polyurethane foam rubber which was then given a thin coating of solid (non-foamed) polyurethane or other tough, flexible material. Since the number of individual inserts 118 being used with panel 110 determines the needed diameter of plug 150, several different-sized plugs might be provided. Alternatively, a single plug having multiple, removable layers 152a, 152b, and so forth can be used (FIG. 9), each successive plug or layer having an outside diameter corresponding to the inside diameter of one of inserts 118.

Figure 10:
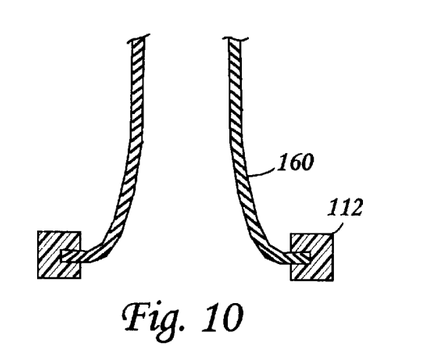
FIG. 10 is a cross-sectional view of still another access frame usable with the present invention.

For still more isolation, a permanent or removable sleeve or glove 160 may be attached to panel 112 (FIG. 10). Glove 160 extends into the work area (i.e., the interior of enclosure 50), as in a conventional glove box. Iris-type closures may also be useful.

In above-described frame assemblies 64 and 90, the open spaces not occupied by slidable frames 68, 70 and 92, 96, respectively, are covered by curtains made of a material which can expand or contract in the manner of a bellows (curtains 72a, 72b, 94a, 94b, 94c, 98a, 98b, 98c, 98d). In a preferred embodiment of the invention, the curtains are easily removable for replacement, cleaning, and so forth. If desired, the curtains may be attached to the sides of their respective frames and/or frame assemblies in such a way that the user can easily detach a curtain and move it aside in order to transfer equipment and supplies into and out of the enclosure.

Buckling of the curtain material in a direction perpendicular to the frames, potentially caused by the difference in air pressure between the interior and exterior of enclosure 50, may be substantially prevented by running a smooth guide rod or taut cable (the latter preferably given a smooth covering of plastic or similar material) through a series of holes cut through successive pleats or layers of the material near each edge of the bellows and parallel to the direction of bellows expansion and contraction.

Figure 11:
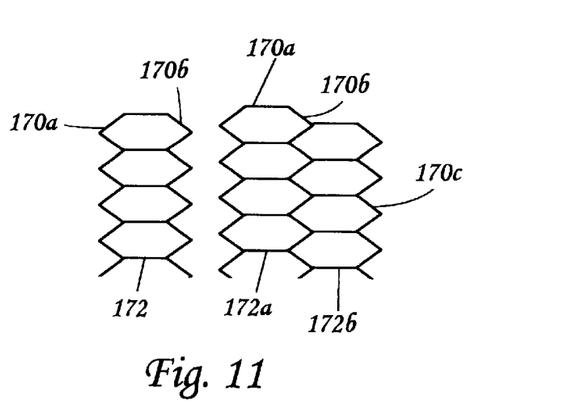
FIG. 11 is a cross-sectional view of two cellular drape materials usable with the invention.

As noted above, the curtains may be made of some flexible, pleated, foldable, or "cellular drape" material which can expand or contract in the manner of a bellows. Cellular drape materials are typically made by joining either two or three pleated sheets 170a, 170b, 170c with adhesive to form a honeycomb-like array of small, hexagonal tubular cells arranged in either a single row 172 or two parallel rows 172a, 172b (FIG. 11). Sheets 170a, 170b, 170c are typically made of thin, nonwoven fabric. Commercially-available examples of cellular drape materials usable with the invention include, but are not limited to, Hunter-Douglas "Applause", "Applause II" and "Duette", Levolorg® "Cirrus", Delmar® "Enchante", and Joanna "Honeycomb."

Figure 12A:
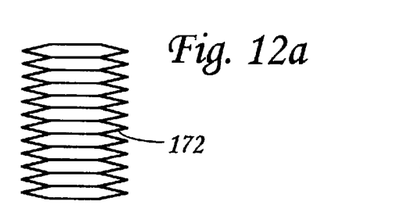
FIGS. 12a and 12b show a single-row cellular drape material in its collapsed and extended states, respectively.
Figure 12B:
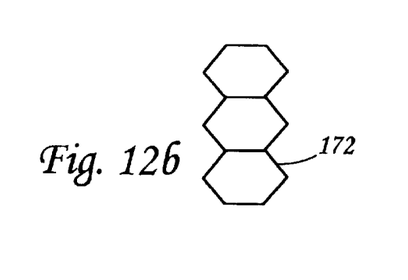

When collapsed, the cells of a cellular drape material become flattened and very short in a direction parallel to the row or rows 172 (FIG. 12a); when extended, the cells become much longer in this dimension while shortening by a far smaller factor in the opposite direction (FIG. 12b). In either case, the tube length remains unchanged.

Preferably, sheets 170a, 170b, 170c are made of a transparent or semi-transparent material to maximize the user's ability to see into the interior of enclosure 50. By way of example, curtains 72, 74 of assembly 60 (and curtains 94, 98 of assembly 90) may have the structure of a conventional cellular shade (as shown schematically in FIGS. 11, 12a, 12b), but made of a dimensionally stable and chemical-resistant sheet material such as polyester (for example, Mylar®). The individual sheets of such a structure are joined by heat-sealing, a transparent adhesive, or other suitable means. More preferably, for greater transparency and thus heightened visibility of objects behind the shade, this material consists of a single rather than a double row of cells.

Figure 13:
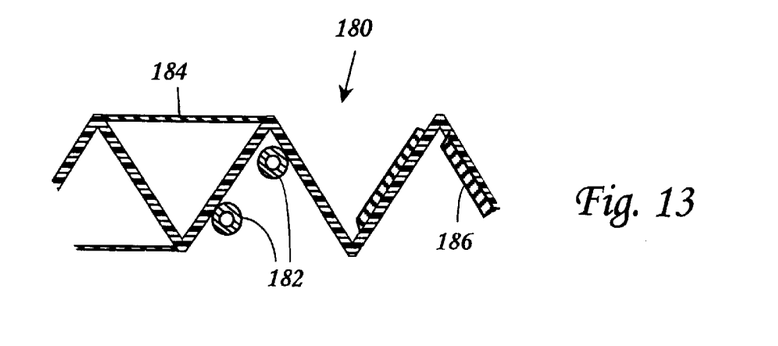
FIG. 13 is a cross-sectional view of another material usable with the invention.

Alternatively, the curtains may be made of a single, pleated sheet of transparent or semi-transparent material, as shown in FIG. 13. A sheet 180 made of such a material may be stiffened in a number of ways, including ribs 182 made of rigid transparent tubing and cemented thereto, ties 184 of transparent material crossing the individual pleats on each side, thicker (and therefore, more rigid) transparent panels 186 applied to some of the flat surfaces between pleats, or by a combination of these methods.

Where ribs 182 are used to stiffen sheet 180, the ribs are preferably offset as shown so that when the sheet is collapsed the ribs fall at varying points along its width and thus permit collapse to a smaller overall thickness than if they were aligned. Alternatively, ribs 182 might all be centered on the width of sheet 180, but spaced several pleats apart so that their total number would be relatively small. Such centered ribs might optionally extend vertically past the edges of the curtain section and ride in grooves formed in support members parallel to the direction of motion (such as support members 54 and 62, FIG. 2) for further support.

As yet another alternative to form a suitable transparent curtain for use with the invention, a commercially-available cellular drape material could be treated to increase its transparency, strength, rigidity and chemical resistance. As still a further alternative, a thin, tough, flexible and chemical-resistant sheet could be bonded to a commercially-available, "sheer" but relatively rigid pleated drape material. Suitable materials consist of nearly opaque material perforated with patterns of small holes. For minimum visual interference, the opaque portion of such a composite is preferably as dark in color as possible.

Figure 14:
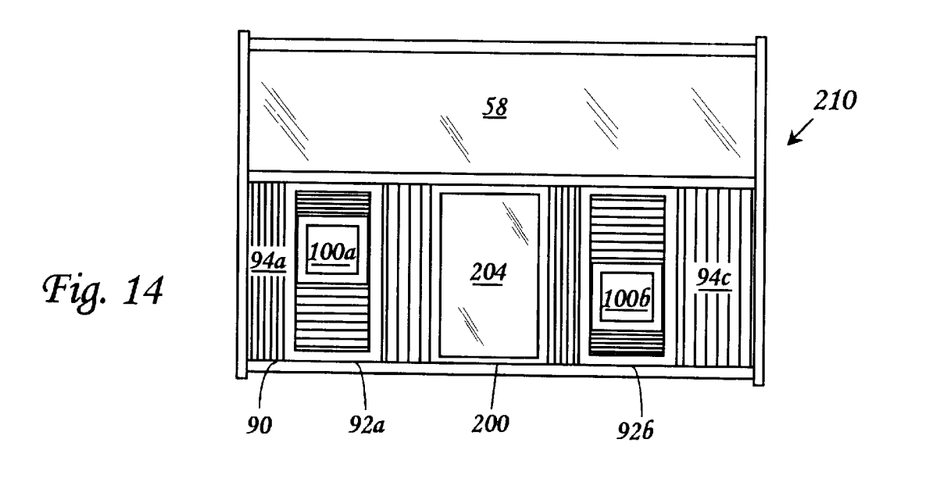
FIGS. 14–18 are front views of door panels according to the present invention.

No matter how optically transparent the material used to make a pleated or bellows-type structure, some distortion is inevitable simply because the material is not flat. For applications requiring better visibility than such a material can inherently provide, it may be useful to provide an additional sliding frame holding, instead of an access port, a window made of clear acrylic, polycarbonate or polyester resin, safety glass, or other suitable flat, transparent material. As shown in FIG. 14, a slidable frame 200 is positioned between frames 92a, 92b of frame assembly 90. Frame 200 is surrounded by curtains 202a, 202b, and holds a window 204. Preferably, frame 200 is between frames 92a, 92b so that it can be positioned directly in front of the user, and remain so despite the user's side-to-side motion, whenever both of the user's arms are in openings 100a, 100b. As will be evident, one or more such additional windows can readily be provided in a frame assembly 60, 90. Window 204 may be movable or removable to facilitate access to the interior of the enclosure when setting up or taking down equipment. It will be evident to those of ordinary skill that numerous ways of moving window 204 aside are feasible. By way of example, window 204 may be attached to frame 200 by hinges or snaps, or slide into position, etc.

The dimensions of enclosure 50 and access zones 64, 90 depend on the contemplated use of the enclosure. The components of frame assemblies 64, 90 may be made from virtually any materials possessing adequate strength, stiffness and chemical resistance. A few such materials are stainless steel, anodized aluminum alloys, fiberglass-polyester composites, and engineering plastics such as polycarbonate. For applications not requiring a high degree of chemical resistance, extruded aluminum might also be suitable. Panels 58 may be made of glass, acrylic, or polycarbonate resin.

For optimum materials isolation, enclosure 50 is provided with suitable fans, pumps, filters, and so forth, to maintain a prescribed minimum air velocity through the interior of the enclosure. Reduced air flow requirements, due to increased isolation of the interior of enclosure 50, mean that smaller ductwork and fans are needed to service the enclosure. Furthermore, filters need to be replaced less often than in conventional enclosures (alternatively, smaller, cheaper filters may be used). Smaller-capacity heating and air conditioning units are needed for installations equipped with the invention; thus, energy and building space are conserved.

An enclosure 50 may be custom-built or assembled from standardized, readily-available components. Furthermore, a frame assembly such as above-described assemblies 60, 90 may be manufactured in a range of standard sizes (which may be adjustable) for retrofitting to existing hoods, isolation enclosures, incubators and the like. By way of example, many hoods have a front opening that can be closed off by a door which slides up and down like a window sash. A user could simply set a frame assembly 64 (or a frame assembly 90) in the opened hood, then close the door against a channel-shaped gasket on the upper edge of assembly 64. The door itself would then hold assembly 64 in place. For retrofitting to existing enclosures, a frame assembly according to the present invention is preferably adjustable in width to allow for variations in the width of existing openings.

Figure 15:
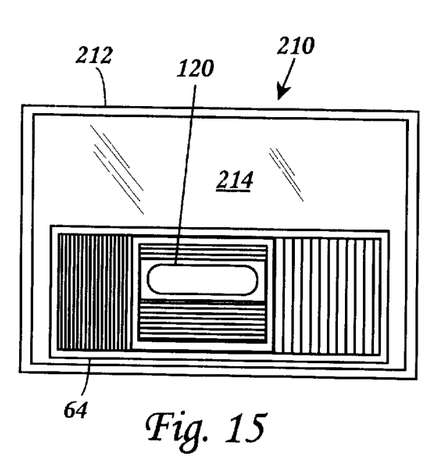

Alternatively, the transparent door panel (or the entire door) of an existing hood, enclosure or like device could be replaced by a panel with at least one frame assembly according to the present invention. Such a replacement panel or door 200 is illustrated in FIG. 15. Panel 210 includes a rigid frame 212 holding a transparent window 214 (preferably made of polycarbonate plastic, safety glass, or some other durable, substantially transparent material). Window 214 has one or more rectangular openings cut therethrough, dimensioned to receive a frame assembly such as assembly 64 or 90, which is retained therein by a suitable gasket. An existing door fitted with a panel 210 operates unimpeded, opening or closing fully without the need to remove frame assembly 64 (or assembly 90). As will be evident, the user has greater vertical motion capability, since frame assembly 64 could be set either vertically or horizontally in the existing door. Since the space within the enclosure could be more fully utilized, smaller enclosures—or a smaller overall number of enclosures—might be needed for a given application, with resulting cost savings.

Figure 16:
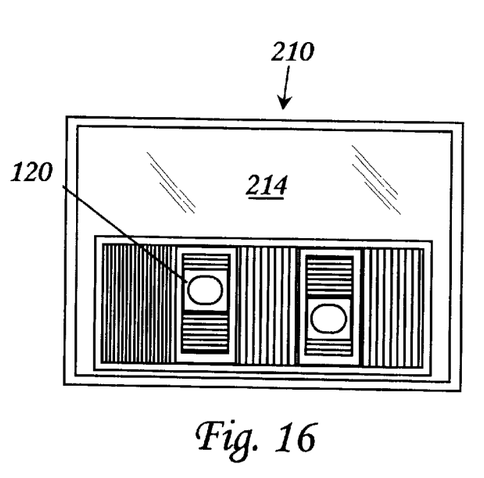
Figure 17:
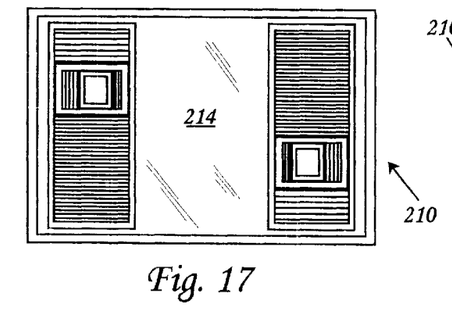
Figure 18:
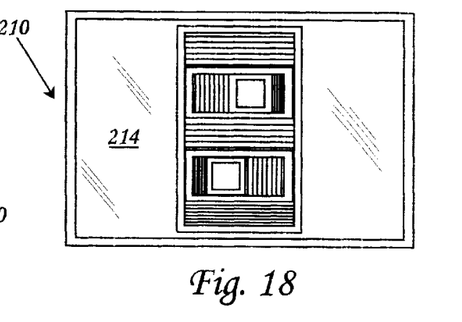

A wide variety of arrangements are possible without departing from the spirit of the invention, using one or more separate frame assemblies depending upon the intended uses of the enclosure (see, for example, FIGS. 16–18). If desired, one or both access ports could include gloves such as that shown in FIG. 10. An enclosure may be equipped with one work station having one or more frame assemblies, or a plurality of work stations. Similarly, an enclosure may have one wall equipped with a frame assembly or assemblies according to the invention, or two or more walls each having its own frame assembly (or assemblies). A plurality of enclosures may be ganged together to form a work space of essentially any desired configuration and dimensions.

Figure 19A:
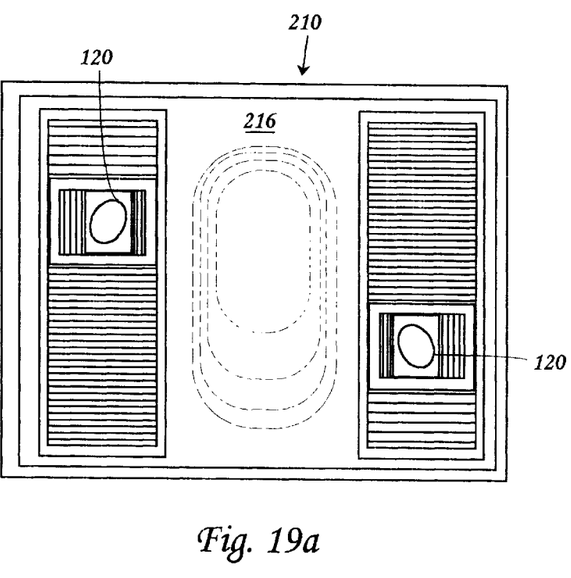
FIG. 19a is a front view of a door panel with a transparent, contoured section.

Openings 120 may assume some other ergonomic shape in addition to the approximately circular shape illustrated in FIG. 4. By way of example, openings 120 may be square or rectangular (FIGS. 2, 3), oval (FIG. 16), or have rounded corners (FIG. 15). A pair of openings could be aligned in accordance with typical working positions, for example, tilted in opposite directions (FIG. 19a).

Figure 19B:
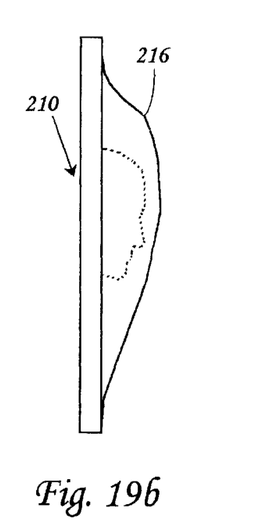

For retrofitting to existing enclosures that do not have moving doors, the frame assemblies (or transparent panels around or between them) would not need to be coplanar. Thus, the frame assemblies could be tilted or formed in any desired fashion to ease viewing and manipulation of the contents of the enclosure. For example, an area 216 between two vertical single-port access frames could be formed into an inwardly-projecting dome, such as a dome with an "inverted nose" contour (that is, extending deeper into the enclosure near the top than near the bottom), protruding into the enclosure. The user could then insert his or her head into the dome and thereby obtain a wider viewing angle, especially downwards towards the floor of the enclosure (FIGS. 19a, 19b).

It will be apparent to those skilled in the art that many changes and substitutions can be made to the preferred embodiment herein described without departing from the spirit and scope of the present invention as defined by the appended claims.

What is claimed is:

1. An enclosure for isolating material from the ambient atmosphere, said enclosure comprising:

a housing having a wall with at least one opening therethrough, said housing having an interior;

a wall closing said at least one opening, said wall having at least one first opening therethrough;

a first access frame mounted in said first opening so that said first frame is movable in a first direction across said first opening, said first frame having a second opening therethrough;

first curtain means attached to said first frame, said first curtain means covering substantially all of said first opening not occupied by said first frame;

a second access frame mounted in said second opening so that said second frame is movable in a second direction across said second opening, said second frame having an access port through which a user can access said interior; and second curtain means attached to said second frame, said second curtain means covering substantially all of said second opening not occupied by said second frame.

2. The enclosure as recited in claim 1, wherein said second direction is perpendicular to said first direction.

3. The enclosure as recited in claim 1, wherein said access port is ergonomically shaped.

4. The enclosure as recited in claim 1, wherein said at least one first opening further comprises two approximately rectangular, spaced-apart openings.

5. The enclosure as recited in claim 1, further comprising a third access frame mounted in said second opening so that said third frame is movable in said second direction across said second opening, said third frame having a port through which a user can access said interior, wherein said second curtain means covers substantially all of said second opening not occupied by said second and said third frames.

6. The enclosure as recited in claim 1, further comprising means for reducing air flow through said port when said port is in use, said flow-reducing means attached to said second frame.

7. An enclosure for isolating material from the ambient atmosphere, said enclosure comprising:

a housing having a wall with at least one opening therethrough;

a wall closing said at least one opening, said wall including a window portion and at least one access zone;

a first access frame movable within said access zone in a first direction, said first frame having a first opening therethrough;

a first flexible curtain, said first curtain positioned to cover substantially all of said access zone not occupied by said first frame, said first curtain permitting movement of said first frame within said access zone;

at least one second access frame movable within said first opening in a second direction, said second direction being approximately perpendicular to said first direction, said second frame having an access port through which a user can access said interior; and a second flexible curtain, said second curtain positioned to cover substantially all of said first opening not occupied by said second frame, said second curtain permitting movement of said second frame within said first opening.

8. The enclosure as recited in claim 7, wherein said first frame is movable in a first direction and said second frame is movable in a second direction, said first direction being approximately perpendicular to said second direction, said first and second directions being approximately in the plane of said front wall.

9. The enclosure as recited in claim 7, wherein said at least one access zone further comprises two spaced-apart access zones.

10. The enclosure as recited in claim 7, wherein said at least one access zone is approximately rectangular.

11. The enclosure as recited in claim 7, wherein said access port is ergonomically shaped.

12. The enclosure as recited in claim 7, wherein said first and said second curtains are made of cellular drape material.

13. The enclosure as recited in claim 7, further comprising removable means for reducing air flow through said access port when said access port is in use, said flow-reducing means attachable to said second frame.

14. The enclosure as recited in claim 7, further comprising removable means for reducing air flow through said access port when said access port is not in use.

15. A device for use with an isolation enclosure, said enclosure including a housing with a wall and an opening therethrough, said device comprising:

a panel having at least one first opening therethrough;

a first access frame mounted in said first opening, said first frame having a second opening therethrough, said first frame movable in a first direction across said first opening;

a first flexible curtain connected to said first frame and said first opening, said first curtain positioned to cover, at all times, substantially all of said first opening not occupied by said first frame;

at least one second access frame mounted in said second opening, said second frame movable in a second direction across said second opening, said second direction being approximately perpendicular to said first direction, said second frame having an access port through which a user can access said interior; and a second flexible curtain connected to said second frame and said second opening, said second curtain positioned to cover, at all times, substantially all of said second opening not occupied by said second frame.

16. The device as recited in claim 15, wherein said access port is ergonomically shaped.

17. The device as recited in claim 15, wherein said panel includes a window portion.

18. The device as recited in claim 15, wherein said at least one first opening further comprises a pair of spaced-apart openings.

19. The device as recited in claim 15, further comprising means for securing said device to said wall of said enclosure.

20. The device as recited in claim 15, wherein said enclosure includes a movable door mounted in said opening, said door having a rim, and wherein said panel has an edge formed for receiving said rim.

21. The device as recited in claim 15, further comprising means for reducing air flow through said port when said port is in use, said flow-reducing means attachable to said second frame.

22. The device as recited in claim 15, further comprising removable means for reducing air flow through said port when said port is not in use.

23. The device as recited in claim 15, wherein said first curtain and said second curtain are removably connected to said first frame and said second frame, respectively.

24. The device as recited in claim 15, wherein said first curtain and said second curtain are removably connected to said panel.

25. The device as recited in claim 15, wherein said panel is adjustable in width.

26. The enclosure as recited in claim 1, wherein said first access frame and said second access frame are mounted so that movement of said first access frame and said second access frame is approximately in the plane of said wall.

27. The enclosure as recited in claim 1, wherein said first curtain means further comprises a curtain made of a flexible, foldable, pleatable, or cellular drape material.

28. The enclosure as recited in claim 1, wherein said second curtain means further comprises a curtain made of a flexible, foldable, pleatable, or cellular drape material.

29. The enclosure as recited in claim 7, wherein said first and said second curtains are made of a flexible, foldable, or pleatable material.

30. The enclosure as recited in claim 15, wherein said first and said second curtains are made of a flexible, foldable, or pleatable material.

31. The enclosure as recited in claim 1, wherein said at least one first opening further comprises two spaced-apart first openings, and wherein first and second access frames mounted in one of said two first openings are movable independently of first and second access frames mounted in the other of said two first openings.

32. The enclosure as recited in claim 7, wherein said at least one access zone further comprises two spaced-apart access zones, and wherein first and second access frames mounted in one of said two access zones are movable independently of first and second access frames mounted in the other of said two access zones.

33. The enclosure as recited in claim 15, wherein said at least one first opening further comprises two spaced-apart first openings, and wherein first and second access frames mounted in one of said two first openings are movable independently of first and second access frames mounted in the other of said two first openings.

* * * * *